US012248096B2

(12) United States Patent
Nauen et al.

(10) Patent No.: US 12,248,096 B2
(45) Date of Patent: Mar. 11, 2025

(54) DISTANCE-MEASURING UNIT WITH A DETECTION FIELD SUBDIVIDED INTO A PLURALITY OF RECEIVER SOLID ANGLE SEGMENTS

(71) Applicant: OSRAM GMBH, Munich (DE)

(72) Inventors: Andre Nauen, Regensburg (DE); Sergey Khrushchev, Regensburg (DE); Christian Gammer, Traitsching (DE)

(73) Assignee: OSRAM Beteiligungsverwaltung GmbH, Grünwald (DE)

( * ) Notice: Subject to any disclaimer, the term of this patent is extended or adjusted under 35 U.S.C. 154(b) by 1054 days.

(21) Appl. No.: 17/048,664

(22) PCT Filed: Mar. 13, 2019

(86) PCT No.: PCT/EP2019/056211
§ 371 (c)(1),
(2) Date: Oct. 19, 2020

(87) PCT Pub. No.: WO2019/201515
PCT Pub. Date: Oct. 24, 2019

(65) Prior Publication Data
US 2021/0165078 A1      Jun. 3, 2021

(30) Foreign Application Priority Data

Apr. 19, 2018   (DE) .................... 10 2018 206 014.2

(51) Int. Cl.
*G01S 7/481*   (2006.01)
*G01S 17/42*   (2006.01)
*G01S 17/931*  (2020.01)

(52) U.S. Cl.
CPC .......... *G01S 7/4815* (2013.01); *G01S 7/4817* (2013.01); *G01S 17/42* (2013.01); *G01S 17/931* (2020.01)

(58) Field of Classification Search
CPC ....... G01S 7/4817; G01S 7/4815; G01S 17/42
See application file for complete search history.

(56) References Cited

U.S. PATENT DOCUMENTS

| 2014/0240317 A1 | 8/2014 | Go et al. |
| 2016/0047895 A1 | 2/2016 | Dussan |

(Continued)

FOREIGN PATENT DOCUMENTS

| DE | 10 2004 033 928 A1 | 2/2006 |
| DE |    102005049471 A1 | 5/2007 |

(Continued)

OTHER PUBLICATIONS

"MEMS Mirror Array—Beam Steering Mode," 2 pages, uploaded on Aug. 10, 2017 by user "Preciseley Microtechnology Corporation." Retrieved from Internet: <www.youtube.com/watch?v=wHIUU3kKtzM>. (Year: 2017).*

(Continued)

*Primary Examiner* — Yuqing Xiao
*Assistant Examiner* — Zhengqing Qi
(74) *Attorney, Agent, or Firm* — Slater Matsil, LLP

(57) ABSTRACT

Various implementations disclosed herein include a distance measuring unit for measuring, on the basis of a time-of-flight signal, a distance to an object situated in a detection field. The distance measuring unit includes an emitter unit for emitting pulses in the form of electromagnetic radiation, and a receiver unit comprising a sensor area for receiving the electromagnetic radiation in the form of echo pulses, and a mirror unit disposed upstream of the sensor area, wherein a detection field of the receiver unit is subdivided into a plurality of receiver solid angle segments, and wherein the plurality of receiver solid angle segments are assigned to the same sensor area in that echo pulses incident on the mirror unit from a respective receiver solid angle segment are (Continued)

reflected onto the sensor area when the mirror unit is in a tilt state associated with the respective receiver solid angle segment.

15 Claims, 5 Drawing Sheets

(56) References Cited

U.S. PATENT DOCUMENTS

| | | |
|---|---|---|
| 2016/0209499 A1 | 7/2016 | Suzuki |
| 2016/0306041 A1 | 10/2016 | Lu et al. |
| 2017/0176579 A1* | 6/2017 | Niclass .................. G01S 17/10 |
| 2019/0107607 A1* | 4/2019 | Danziger .............. G01S 7/4802 |
| 2019/0318177 A1* | 10/2019 | Steinberg ............... G06V 10/60 |

FOREIGN PATENT DOCUMENTS

| | | |
|---|---|---|
| DE | 10 2016 219 955 A1 | 4/2018 |
| WO | 2017040066 A1 | 3/2017 |
| WO | WO2017162647 A1 * | 9/2017 |
| WO | 2018055449 A2 | 3/2018 |

OTHER PUBLICATIONS

Machine translation of WO2017162647A1 (Year: 2017).*
Abraham Kaleve, International Search Report and Written Opinion of the International Searching Authority, for counterpart application PCT/EP2019/056211, Jun. 12, 2019, European Patent Office, Rijswijk, The Netherlands, 14 pages.
Dr. Kowalski, German Search Report, for counterpart application DE 10 2018 206 014.2, Mar. 25, 2021, German Patent Office, Munich, Germany, 8 pages.

* cited by examiner

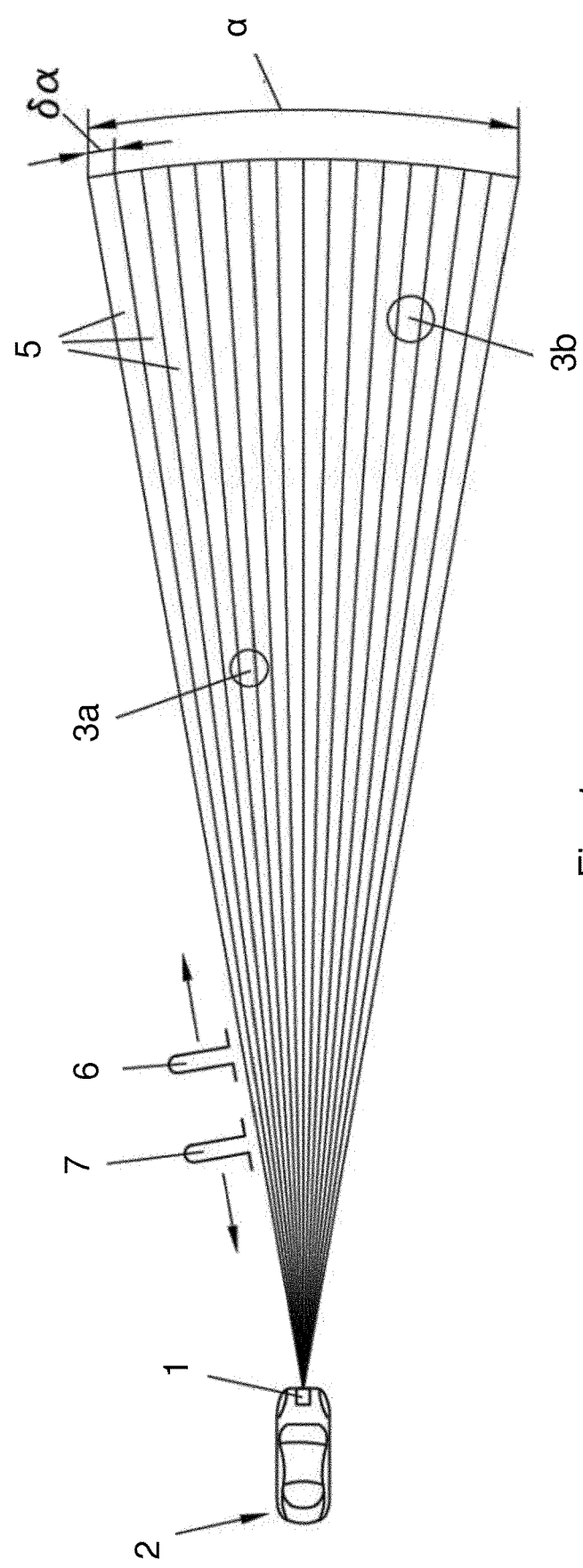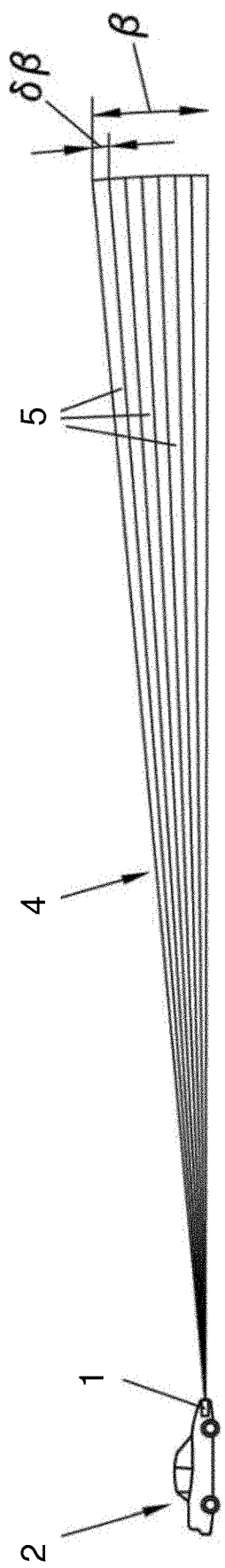
Fig. 1a
Fig. 1b

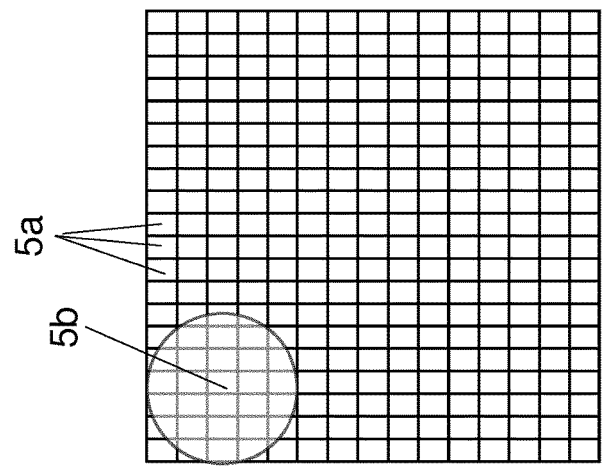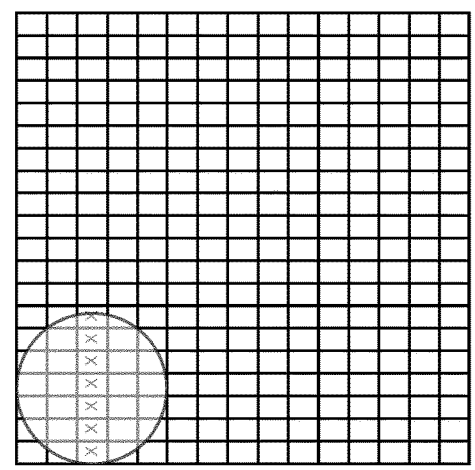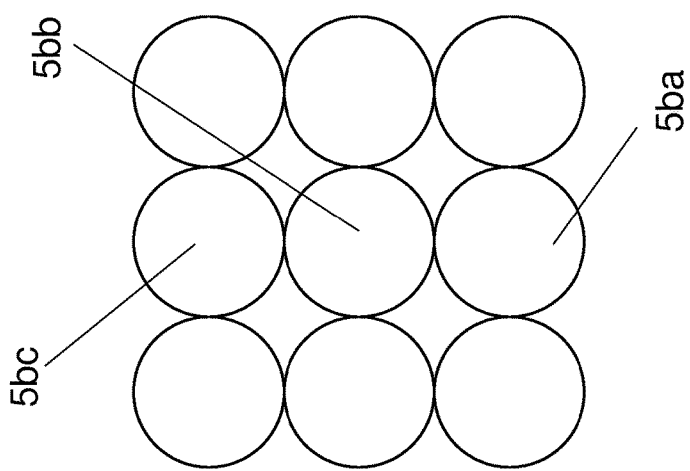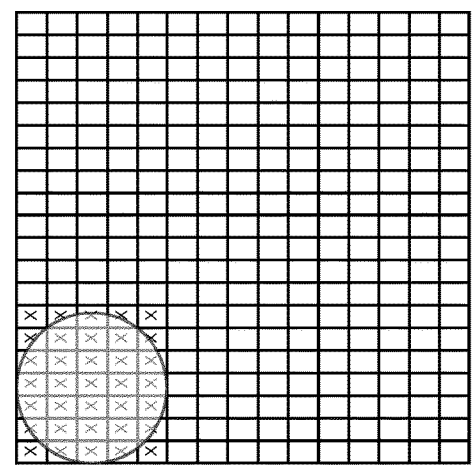

DISTANCE-MEASURING UNIT WITH A DETECTION FIELD SUBDIVIDED INTO A PLURALITY OF RECEIVER SOLID ANGLE SEGMENTS

CROSS-REFERENCE TO RELATED APPLICATIONS

The present application is a National Stage application of, and claims priority, and the benefit of International Application No. PCT/EP2019/056211, filed Mar. 13, 2019, entitled "ABSTANDSMESSEINHEIT", which claims priority, and the benefit of German Application No. 10 2018 206 014.2, filed Apr. 19, 2018, entitled "ABSTANDSMESSEINHEI", each of which are incorporated by reference in their entirety.

TECHNICAL FIELD

The present invention relates to a distance measuring unit for measuring a distance on the basis of a signal time-of-flight.

PRIOR ART

The distance measurement in question is based on a time-of-flight measurement of radiated electromagnetic pulses. If these strike an object, a portion of the pulse is reflected back to the distance measuring unit at the surface of said object and can be recorded as an echo pulse using a suitable sensor. If the pulse is radiated at a time $t_0$ and if the echo pulse is detected at a subsequent time $t_1$, the distance d to the reflective surface of the object can be determined by way of the time-of-flight $\Delta t_A = t_1 - t_0$ according to $$d = \Delta t_A c/2 \qquad \text{Equation 1}$$

Since this relates to electromagnetic pulses, c is the speed of light.

SUMMARY OF THE INVENTION

The present invention is based on the technical problem of specifying a particularly advantageous distance measuring unit.

According to the invention, this is achieved by the distance measuring unit as claimed in claim 1. The detection field of this distance measuring unit is subdivided, i.e., partitioned, into a plurality of solid angle segments. Here, the distance measuring unit allows an assignment of the received echo pulses to a respective solid angle segment, i.e., a distance image of the detection field can be recorded with a certain resolution or pixelation (a solid angle segment corresponds to a pixel, which is also referred to as VOXEL). Now, a peculiarity of the present case lies in the realization of this resolution, or a part thereof, specifically on the receiver side.

This is because the receiver unit comprises a mirror unit which always only reflects an echo pulse incident from a respective receiver solid angle segment to the sensitive sensor area of a radiation sensor in a certain, fitting tilt state. Thus, different receiver solid angle segments are assigned to the same sensor area, and so the receiver unit "listens" for a return of an echo pulse in a respective one of the receiver solid angle segments (depending on configuration and operation, a plurality of segments can optionally also be listened to at the same time; see below for details) depending on the tilt state of the mirror unit.

Thus, the receiver unit is sensitive to solid angle and a resolution or pixelation can also be achieved in combination with an emitter unit that is not solid angle-selective per se. By way of example, the emitter unit can also emit the pulses into the entire detection field each time, and the return of an echo pulse is then successively listened out for in the individual receiver solid angle segments using the solid angle-sensitive receiver unit (as a rule, the emitter unit will emit a multiplicity of pulses in succession). This only serves as an illustration; other options are discussed in detail below.

The realization of the solid angle resolution by means of the mirror unit, which assigns the different receiver solid angle segments to the same sensitive sensor area can be advantageous, for example, to the extent that this allows the provision of a particularly sensitive and hence complicated or expensive sensor. Overall, the high price then is less weighty since a plurality of receiver solid angle segments share the same sensor (unlike the case where a dedicated sensor area is required for each spatial direction). By way of example, a sensor with increased sensitivity can help improve the range, specifically by also still facilitating the detection of echo pulses with a comparatively low intensity.

Preferred configurations are found in the dependent claims and in the entire disclosure, a detailed distinction not always being made between apparatus and method or use aspects when presenting the features; in any case, the disclosure should be read as implicit in respect of all claim categories. Thus, for example, if a distance measuring unit is described that is suitable for a certain type of operation, this should simultaneously be considered a disclosure of a corresponding operating method, and vice versa.

In the case of the preferred automotive applications, the detection field can extend, for example, over a larger angular range and/or can have a finer subdivision in the horizontal direction than in the vertical direction, although this is generally not mandatory. By way of example, the detection field can be described by a full horizontal and vertical angle (cf. the exemplary embodiment for illustrative purposes), wherein, as a rule, at least the horizontal angle, but preferably also vertical angle, is correspondingly subdivided by way of the segmentation.

By subdividing the detection field into receiver solid angle segments, the distance measuring unit has a solid angle resolution, at least along one axis. As discussed in detail below, there preferably also is a solid angle resolution along a second axis, the latter possibly arising as a result of the receiver unit (ultimately the mirror unit) and/or else as a result of a solid angle-selective emitter unit; see below for more detail. However, the solid angle resolution only along precisely one axis may also be of interest, for instance a horizontal segmentation of the detection field in the case of automotive applications, particularly in the case of very significant ranges (>300 m).

In a preferred embodiment, a photodiode forms the sensitive sensor area. In general, any desired detector able to convert electromagnetic radiation of the echo pulses into an electrical signal comes into question, for example also a CMOS sensor, i.e., a planar sensor whose pixels combined by circuitry can together form the sensitive sensor area. However, a photodiode is preferably provided, for example a PIN diode, APD (avalanche photodiode) or SPAD (single photon APD), or else a photomultiplier. In general, the photodiode can be optimized toward a high sensitivity, for example; see above. Very generally, a sensor which has a sensitivity that is as constant as possible over the sensor area, the measurement being carried out without a spatial resolution, is preferred; the signal should also be as independent as possible of the angle of incidence. Preferably, the receiver unit or the distance measuring unit even only has a single photodiode, which can then have a correspondingly sensitive or high-quality, etc. embodiment; see above.

In a preferred configuration, the mirror unit has a multiplicity of mirror areas, which are tiltable independently of one another. Naturally, the latter does not imply that there is no circuitry-type linking between the mirror areas or no common actuation; the latter is even preferred in respect of a correlation of the sequential scanning of the receiver solid angle segments.

A respective mirror area links a respective receiver solid angle segment with the sensor area in such a way that an echo pulse incident from this receiver solid angle segment is reflected onto the sensor area in a respective tilt position but not reflected thereon in a different tilt position. By way of example, an absorber or a beam dump can be provided, onto which the echo pulses incident from the respective non-scanned receiver solid angle segments are reflected.

In general, a MEMS mirror, which is tilted back and forth in oscillating fashion, is also conceivable as an alternative to a mirror unit with a plurality of mirror areas. If a line is imagined from the sensor area to the MEMS mirror, said line being reflected at the latter, then this reflected line passes over the receiver solid angle segments with the oscillation of the MEMS mirror. A respective receiver solid angle segment is linked to the sensitive sensor area at a respective instant of the oscillation. By contrast, a structure with a plurality of mirror surfaces may for example be advantageous, however, inasmuch as the flexibility is greater, specifically, for example, it being possible to alter the time duration during which a respective mirror area is in the fitting tilt position. It is possible to set the time during which a respective receiver solid angle segment is listened to; i.e., the range is adjustable.

In general, the measurement duration per receiver solid angle segment is determined according to the desired range. Twice the range is the maximum path of pulse and echo pulse, which defines the measurement duration by way of the speed of light. By way of example, said measurement duration must be 2 μs for a range of 300 m.

A pulse is a time-limited quantity which is emitted in order to subsequently be detected with a time offset by a sensor of the distance measuring unit in the case of a reflection at the object. By way of example, a pulse width, measured according to the full width at half maximum (FWHM), can be no more than 1 ms but can preferably be significantly shorter than that, specifically, with increasing preference in the sequence as listed, no more than 800 μs, 600 μs, 400 μs or 200 μs, or even shorter, specifically no more than 1000 ns, 900 ns, 800 ns, 700 ns, 600 ns, 500 ns, 400 ns, 300 ns, 200 ns, 100 ns, 80 ns, 60 ns, 40 ns, 30 ns, 25 ns, 20 ns, 15 ns, 10 ns, 5 ns or 2 ns (with increasing preference in the sequence as listed). In principle, the shortest pulse possible can be preferable; for technical reasons, there may be lower limits at, for example, at least 0.001 ns, 0.01 ns or 0.1 ns.

In a preferred embodiment relating to the variant with a plurality of mirror areas, each of these mirror areas is formed by a dedicated mirror component. Thus, the mirror areas are not provided integrally on the same component or are not provided in array form at the outset; instead, for example, a plurality of MEMS mirrors joined to one another can form the mirror unit together. By way of example, these can be arranged together on a circuit board and can be driven by a common control unit (clocked relative to one another). As an alternative to a MEMS mirror, however, any other tiltably mounted mirror is also possible, which, for example, is movable back and forth between two (or at least two) tilt positions by way of a linear actuator.

To the extent general reference is made to tilting or tilt states or tilt positions in the present case, this relates to a certain angle between mirror area and sensor area or to a changing angle. In general, this angle change may also arise from pivoting the mirror surface, for example; however, the corresponding tilt axis preferably passes through the mirror, in particular the mirror area.

In general, a DMD array with a multiplicity of micromirror actuators is also conceivable as an alternative to an array made of a plurality of mirror components. By way of example, this can be of interest inasmuch as this can even achieve a two-dimensional subdivision of the detection field as the array has a planar resolution (which can be converted into a solid angle resolution by means of an optical unit). In the case of the DMD array, a dedicated solid angle segment need not necessarily be assigned to each actuator by way of example, a plurality of actuators can also be combined in groups.

In general, if a plurality of mirror areas are provided, a common optical unit is disposed upstream thereof in a preferred configuration. The latter relates to the incident echo pulses; i.e., said echo pulses strike or pass through the optical unit first. Expressed very generally, the optical unit images a respective solid angle segment on the sensor area or, initially, on the mirror area which links the solid angle segment to the sensor. Alternatively, or preferably in connection therewith, there can also be a detector optical unit which images the respective mirror area on the sensor area. By way of example, this can be advantageous if the sensitive sensor area is smaller than the overall area of the mirror areas arranged in row or matrix-type fashion, i.e., if, expressed differently, the etendue of the mirror system and that of the sensor have to be matched to one another.

In general, should reference be made to an optical unit, a reflector is generally also conceivable although a lens or lens system (made of a plurality of individual lenses) is preferable. By way of example, a converging lens disposed upstream of the mirror unit can image each receiver solid angle segment on a respective mirror area; as an alternative or preferably in addition thereto, a different converging lens than the detector optical unit can image the respective mirror area on the sensor area. The converging lens disposed upstream of the mirror unit is preferably arranged in such a way that it images the mirror areas at infinity (the detection field) in each case.

In a preferred embodiment, the emitter unit is designed for solid angle-selective radiation of the pulses. On the part of the emitter unit, the detection field is therefore subdivided into the emitter solid angle segments and a respective pulse can be selectively emitted into one of the emitter solid angle segments. Like in the case of the receiver unit, this subdivision initially exists at least in relation to one axis although a subdivision along two axes is also possible (see below). By way of example, the detection field can be subdivided into the emitter solid angle segments using a scanning mirror, for instance a MEMS mirror. Depending on the mirror position, the pulse coming from an individual emitter is then reflected into a respective emitter solid angle segment (in order then to possibly return as an echo pulse following a reflection at an object). In this way, a solid angle-selective radiation is possible even using a single individual emitter.

In a preferred embodiment, the emitter unit comprises a plurality of individual emitters, which each emit into one of the emitter solid angle segments. The emitters are preferably arranged next to one another in a row or, in the case of a matrix, in a plurality of rows. In principle, the individual emitters are each drivable on their own such that a pulse can be selectively emitted from the respective emission area. Nevertheless, a circuit-side link of the individual emitters is possible and also preferable in the emitter unit so that the emission of one respective emitter is clocked with that of the others.

In general, for example, there could also be an arrangement in which a dedicated optical unit is assigned to each of the emitters and/or the emitters are arranged in such a way that the emission areas face the different emitter solid angle segments while having a tilt with respect to one another. Preferably, a common optical unit is disposed downstream of the emitters (in relation to the radiated pulses), preferably a converging lens or a converging lens system. Preferably, the optical unit images the emission areas at infinity, as a result of which a spatial distribution of the emission areas arranged next to one another is converted into a solid angle distribution. By way of example, the emission areas can also lie in a common plane with one another, which may be advantageous from an assembly point of view.

In general, an emitter is designed for pulsed emission of electromagnetic radiation. Preferably, the radiation is in the infrared range, i.e., having wavelengths of, for example, at least 600 nm, 650 nm, 700 nm, 750 nm, 800 nm or 850 nm (with increasing preference in the sequence as listed). By way of example, around 905 nm can be particularly preferred, wherein, in this respect, advantageous upper limits can lie at no more than 1100 nm, 1050 nm, 1000 nm or 950 nm (with increasing preference in the sequence as listed). A further preferred value can lie around 1064 nm, for example, which yields advantageous lower limits of at least 850 nm, 900 nm, 950 nm or 1000 nm and (independently thereof) advantageous upper limits of at most 1600 nm, 1500 nm, 1400 nm, 1300 nm, 1200 nm or 1150 nm (respectively with increasing preference in the sequence as listed). Preferable values can also lie around 1548 nm or 1550 nm, which yields advantageous lower limits of at least 1350 nm, 1400 nm, 1450 nm or 1500 nm and (independently thereof) advantageous upper limits of at most 2000 nm, 1900 nm, 1800 nm, 1700 nm, 1650 nm or 1600 nm (respectively with increasing preference in the sequence as listed). However, in general, wavelengths in the far IR, for example, are also conceivable, for example at 5600 nm or 8100 nm.

In a preferred embodiment, the solid angle sensitive receiver unit is solid angle-resolving along a first axis and the solid angle-selective emitter unit is solid angle-resolving along a second axis. Here, the emitter and receiver unit are arranged with respect to one another in such a way that the two axes are at an angle to one another, i.e., not parallel to one another, and preferably perpendicular to one another. Hence, the detection field is subdivided into the receiver solid angle segments along the one axis and into the emitter solid angle segments along the other axis; overall, it has a matrix shape, i.e., a plurality of rows and a plurality of columns. A respective matrix field (a specific row and column) arises as the intersection of a respective receiver solid angle segment and a respective emitter solid angle segment.

Thus, in one sense, the receiver solid angles are wedges which fan the detection field open along one direction and the wedges of the emitter solid angle segments fan it open perpendicular thereto. A respective matrix field arises as an intersection of two wedges, i.e., as a cone in one sense.

Once again for illustrative purposes, if one gazes into the detection field from the view of the distance measuring unit, said detection field can be subdivided, e.g., vertically (from top to bottom) into a plurality of rows and horizontally (from left to right) into a plurality of columns. By way of example, the subdivision into columns can be realized on the part of the emitter and said subdivision into rows can be realized on the part of the receiver such that therefore each emitter solid angle segment defines a column and each receiver solid angle segment defines a row. A respective matrix field is then defined by the combination of a certain emitter solid angle segment (column) and a certain receiver solid angle segment (row).

Naturally, the reverse arrangement would also be possible, i.e., a horizontal subdivision on the part of the receiver and a vertical subdivision on the part of the emitter. In general, the receiver solid angle segments adjoin one another along the first axis and the emitter solid angle segments adjoin one another along the second axis. The one of the axes then lies vertically (subdivision into rows) and the other lies horizontally (subdivision into columns); together, the axes span the detection field.

Preferred ways of operation are described below; this should be read both in respect of a corresponding operating method and in respect of a correspondingly configured distance measuring unit. The latter means that, for example, the distance measuring unit is equipped with a control unit in which a program sequence is stored, for example in a microcontroller, said program sequence specifying a corresponding operation.

In a preferred configuration, a second individual emitter initially emits into a second emitter solid angle segment after a first individual emitter has emitted into a first emitter solid angle segment. A matrix field of the first emitter solid angle segment was scanned with the emission of the first individual emitter; a matrix field of the second emitter solid angle segment is scanned with the subsequent emission of the second individual emitter. Expressed differently, when changing from matrix field to matrix field there is also change between the emitter solid angle segments; preferably, no directly following matrix fields are located within the same emitter solid angle segment during the entire scanning cycle.

Once there has been an emission from the first emitter during the scanning of the matrix field, all other emitters preferably first of all emit into their respective emitter solid angle segment before the first emitter emits into the first emitter solid angle segment again (in order to scan a different matrix field therein). This can be advantageous from a thermal point of view because the time duration between two pulses of the same emitter is maximized, and hence the thermal load thereof is reduced.

In general, a fixed scheme can be specified for the emission of the pulses or the scanning of the matrix fields of the respective emitter solid angle segment, with said scheme remaining constant over the scanning cycles. However, this is not mandatory, an adaptation (see below) or, in general, even a randomly distributed variation could also be conceivable.

In a preferred embodiment, a first subset of the matrix fields is scanned during a first scanning cycle and a second subset is scanned during a subsequent second scanning cycle. These subsets differ at least in part; thus, matrix fields that were not scanned during the other scanning cycles are found in at least one of the subsets (preferably, this applies to each of the subsets). A division of the matrix fields such that the subsets are disjoint can be particularly preferred. Consequently, no matrix field is scanned twice during the first and the second scanning cycle.

Preferably, all matrix fields are scanned in total in successive scanning cycles. In general, the division is not necessarily restricted to two successive scanning cycles; instead, a subset could also, for example, be respectively scanned in at least three successive cycles, with these subsets together filling the detection field (possible upper limits can be, for example, at most 10, 8 or 6 scanning cycles).

In addition to the subsets being at least partly, preferably completely disjoint, the matrix fields of each subset should "span the detection field" when considered on their own. Thus, at least in this mode of operation, it should not be the case that the matrix fields of one subset are located in one image half and the matrix fields of the other subset are located in the other image half. Instead, the matrix fields of each subset should be distributed over the entire detection field as far as possible; thus, in the ideal case, they should together respectively span an aperture angle along two axes, which aperture angle corresponds to the full horizontal and vertical angle. If the detection image is viewed from the view of the distance measuring unit, i.e., as a two-dimensional projection in one sense, an envelope placed around the matrix fields of the respective subset should, for example, have an area which makes up at least 80% or 90% of the entire detection field (100% are also possible in the case of multiple scanning of the matrix fields in the corners; however, an upper limit might also lie at 95%, for example).

In a preferred configuration, the distance measuring unit is configured to combine a first distance image, which arises from scanning the first subset, and a second distance image, which arises from the second subset, to form one distance image. Since the distance images can be traced back to the at least partly disjoint matrix fields, this distance image then has a higher resolution than the first and the second distance image respectively on its own. In general, scanning subdivided in subsets can already be advantageous or can also be advantageous since this creates a certain adjustability or variability between image resolution and frame rate.

By way of example, if only the subsets are scanned and the distance images resulting therefrom are considered, these respectively have lower resolution since a distance value is not available for each matrix field. Since, on the other hand, it is not necessary to measure each matrix field in the process either, a distance image with a correspondingly lower resolution is available more quickly; thus, the frame rate can be increased overall. In particular, the aforementioned combination of a plurality of distance images with a reduced resolution can also be advantageous, with the spatial resolution being increased therewith to the detriment of the time resolution (frame rate); thus, in one sense, the image structure arises in interleaved fashion by the joining of a plurality of images that were recorded with a time offset.

A preferred application is found in the automotive sector. If here, by way of example, a speed of 130 km/h is assumed, the vehicle travels a distance of 36 m per second, corresponding to 36 mm/ms, i.e., 36 mmkHz. By way of example, if a measurement accuracy of +/−30 mm is sought after for the distance image, this can easily be achieved with scanning frequencies ≥1 kHz (condition of quasi-stationarity is sufficiently satisfied within a scanning period).

In a preferred embodiment, the receiver unit is configured for matrix-type scanning of the detection field; i.e., the receiver solid angle segments subdivide the detection field along two axes at an angle to one another, preferably along two perpendicular axes. In this variant, a two-dimensional distance image then does not only arise in combination with a solid angle-selective emitter unit but already on the part of the receiver (even though combination with a solid angle-selective emitter is possible; see below). Thus, for example, the receiver solid angle segments subdivide the detection field in the vertical and horizontal direction.

In a manner analogous to the explanation given above, a corresponding receiver unit can be realized using an imaging optical unit which images the solid angle segments onto a matrix-shaped array of the mirror areas. Then, in the respectively suitable tilt position, each of the mirror areas transmits the echo pulse or pulses incident from the respective receiver solid angle segment to the sensitive sensor area (instead of a two-dimensional array of mirror areas, a mirror tiltably mounted on two axes would also be conceivable, at least in principle, albeit not preferred).

Independently of the implementation in detail, the matrix-shaped solid angle-sensitive receiver unit can be combined, for example, with an emitter unit which respectively emits its pulses into the entire detection field. Ideally, an emitter which illuminates or irradiates the detection field as uniformly as possible is provided to this end. Naturally, it is not mandatory for precisely one individual emitter to be provided for this purpose; instead, a plurality of emitters can also be combined. The latter can be of interest for increasing the intensity and hence also increasing the range in general, even in the case of a subdivision into emitter solid angle segments. Thus, even in the case of a solid angle-selective emitter unit, more than one individual emitter can be assigned to each segment, even though precisely one individual emitter per emitter solid angle segment is preferred.

In a preferred embodiment, the emitter unit is configured for matrix-shaped scanning of the detection field. Thus, the emitter unit facilitates a solid angle-selective emission of the pulses, i.e., the emission of a respective pulse into a respective emitter solid angle segment. Here, the emitter solid angle segments subdivide the detection field along two axes at an angle to one another, preferably along two perpendicular axes. In general, this can also be realized, for example, using a single emitter, the pulses of which are divided among the individual emitter solid angle segments by way of a mirror that is tiltable about two axes (or by way of two successive mirrors that are tiltable about different axes). However, in a manner analogous to the description above, a plurality of individual emitters are preferably provided and arranged in such a way that the emission areas span a matrix. This plane arrangement can then be converted into a solid angle distribution by way of a common imaging optical unit.

Independently of the realization in detail, a solid angle resolution is provided both on the emitter side and on the receiver side in the case of the matrix-shaped solid angle-selective emitter unit on at least one axis. There can be a selective emission into at least some of the solid angle segments and there can simultaneously also be selective listening into these solid angle segments. Such multiple coverage can, for example, improve the signal-to-noise ratio, i.e., can be of interest for a particularly high accuracy and can also open up a verification option.

In a preferred configuration, the receiver side resolution and the emitter side resolution differ from one another, this then initially applies along one axis, preferably along both axes of the matrix shape. Preferably, the resolution arising from the receiver solid angle segments is better than that of the emitter solid angle segments; i.e., the latter subdivide the detection field in coarser fashion than the former.

In general, the combination of different resolutions can be advantageous inasmuch as this also allows an adaptive overall resolution to be realized. In the interplay of frame rate and frame frequency, the measurement can be carried out with the coarser resolution corresponding to the higher frequency in a first operating state, for example. If an object is determined in one of the segments in the process (e.g., in the emitter solid angle segments), then the corresponding segment can be evaluated with a finer resolution (e.g., with the resolution of the receiver solid angle segments). Naturally, further gradations are also possible in this case; thus, for example, the coarser emitter solid angle segment can initially be scanned only along a column or row with the finer resolution of the receiver solid angle segments.

Further, a variation or adaptation is also possible to the effect of the plurality of emitters assigned to different emitter solid angle segments emitting at the same time during a first operating state, yielding a correspondingly reduced emitter-side resolution. However, conversely, this allows an improvement in the signal-to-noise ratio on account of the summed intensity, leading to an increased range. In a second operating state, the emitters then emit sequentially, yielding a higher spatial resolution.

The invention also relates to a method for operating a distance measuring unit as described herein. Here, the distance to an object situated in the detection field is measured on the basis of a signal time-of-flight. To this end, the emitter unit emits the pulses (in solid angle-selective fashion or into the entire detection field; see above) and the echo pulses are detected by the receiver unit, yielding the distance-dependent time-of-flight. Here, the mirror unit is used in such a way that echo pulses incident from different receiver solid angle segments are reflected in sequence to the sensitive sensor area in different states. Thus, if the echo pulses are incident from different receiver solid angle segments at the same time, only one of them is reflected onto the sensor area; the other one or others are not. Echo pulses from the other receiver solid angle segment or segments are then transmitted to the sensor area in the subsequent tilt state or states.

The invention also relates to the use of a distance measuring unit as disclosed herein in a motor vehicle, for example a truck or a motorbike and an automobile. The application is particularly preferred in a partly or fully autonomously driving vehicle. In general, however, an application in an aircraft or watercraft is also conceivable, for instance in an airplane, drone, helicopter, train or ship. Further fields of application can lie in the field of indoor positioning, i.e., the identification of locations of persons and objects within buildings; a capture of a plant structure is also possible (morphological identification when growing plants) for example during growth or ripening phase; applications could also lie in the field of controlling (tracking) effect lighting in the entertainment industry, or controlling (tracking) of a robotic arm in the industrial and medical sector is likewise possible.

A vehicle can comprise a multiplicity of distance measuring units according to the invention, with the detection field or the field of view (FOV) of each of the distance measuring units preferably being spatially disjoint with respect to the other distance measuring unit or units. This allows a relatively large overall solid angle region to be detected (in front, to the side, behind and above the vehicle). If the distance measuring units have different IR laser wavelengths, the detection fields may also be non-disjoint, i.e., at least partly overlap. By way of example, the distance measuring units can be integrated into existing exterior vehicle light systems.

BRIEF DESCRIPTION OF THE DRAWINGS

The invention will be explained in more detail below on the basis of exemplary embodiments, wherein the individual features within the scope of the alternative independent claims may also be essential to the invention in different combinations and, as before, no detailed distinction will be made between the different claim categories.

In detail:

FIG. 1a shows a plan view of a motor vehicle with a distance measuring unit and the detection field thereof subdivided into solid angle segments;

FIG. 1b shows a side view of the arrangement as per FIG. 1a;

FIGS. 6a-d show options for the combination of a matrix-shaped solid angle-selective emitter unit and a matrix-shaped solid angle-sensitive receiver unit.

PREFERRED EMBODIMENT OF THE INVENTION

Figure 2:
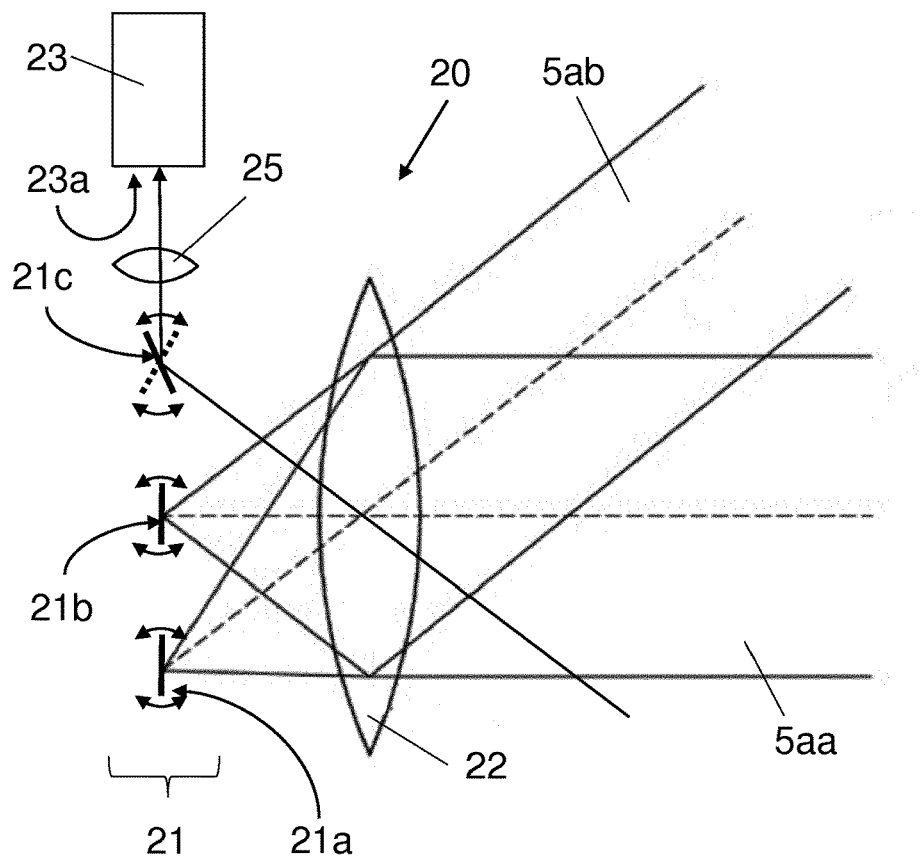
FIG. 2 shows schematic illustrations of a solid angle-sensitive receiver unit as part of the distance measuring unit as per FIGS. 1a, b.

FIGS. 1a, b show a distance measuring unit 1, which is installed in a motor vehicle 2 and aligned in the direction of travel (to the front). Using the distance measuring unit, it is possible to measure the distance to objects 3a, b such as, for example, other vehicles or else pedestrians, etc., when these objects 3a, b are located in the detection field 4 of the distance measuring unit 1. The detection field 4, which has a horizontal aperture angle α and a vertical aperture angle β, is subdivided into a multiplicity of solid angle segments 5, each of which has an aperture angle δα, δβ; cf. also FIG. 2a for illustrative purposes.

The distance measurement is implemented resolved according to the solid angle segments 5; that is to say, for example, the object 3a is distinguishable from the object 3b as being situated in different solid angle segments 5. Depending on the nature (size, surfaces, etc.) and also the distance of the object, it is even possible to differentiate within a respective object 3a,b. For distance measurement purposes, a pulse 6 is emitted in each case, said pulse returning and being received as an echo pulse 7 provided there is an object in the respective solid angle segment 5.

FIG. 2 shows a receiver unit 20, by means of which a subdivision into receiver solid angle segments 5a can be achieved. To this end, provision is made of a mirror unit 21, which is constructed from a plurality of mirror areas 21a-c, each of which is tiltable independently. Each of the mirror areas 21a-c has assigned a respective receiver solid angle segment 5aa, ab via a common optical unit 22 (segment 5ac has not been illustrated for reasons of clarity).

Using this, an echo pulse incident from its respective receiver solid angle segment 5a is steered onto a respective mirror area 21a-c. The mirror areas 21a-c have assigned a common sensitive sensor area 23a, which is formed by a photodiode 23. A detector optical unit 25 images the mirror areas 21a-c onto the sensor area 23a. Each of the mirror areas 21a-c can adopt different tilt positions, with an echo pulse incident from the respective receiver solid angle segment 5a in each case only being reflected onto the sensitive sensor area 23a in a suitable tilt position. This is sketched out in exemplary fashion for the mirror area 21c; the latter would reflect an incident echo pulse to the photodiode 23.

The combination of mirror unit 21 and photodiode 23, together with the optical unit 22, allows a solid angle-sensitive detection or scanning of the detection field 4. The individual receiver solid angle segments 5a are scanned over the course of time; thus, the respective segment is listened to for a certain time duration which corresponds to the desired range in each case. Then, the mirror unit 21 is considered in a different state; thus, for example, the mirror area 21b is tilted in such a way that a possible incident echo pulse is reflected to the photodiode 23, whereas the mirror area 21c is put into a different tilt position (and no longer reflects incident echo pulses to the photodiode 23).

The schematic illustration according to FIG. 2 shows three mirror areas 21a-c; naturally, a greater number of mirror areas can be arranged next to one another in practice, yielding a correspondingly higher resolution. By way of example, if 16 mirror areas are arranged next to one another, the detection field 4 according to FIG. 1a could be subdivided to 16 receiver solid angle segments 5a, which span the detection field 4 in the horizontal direction.

Figure 3:
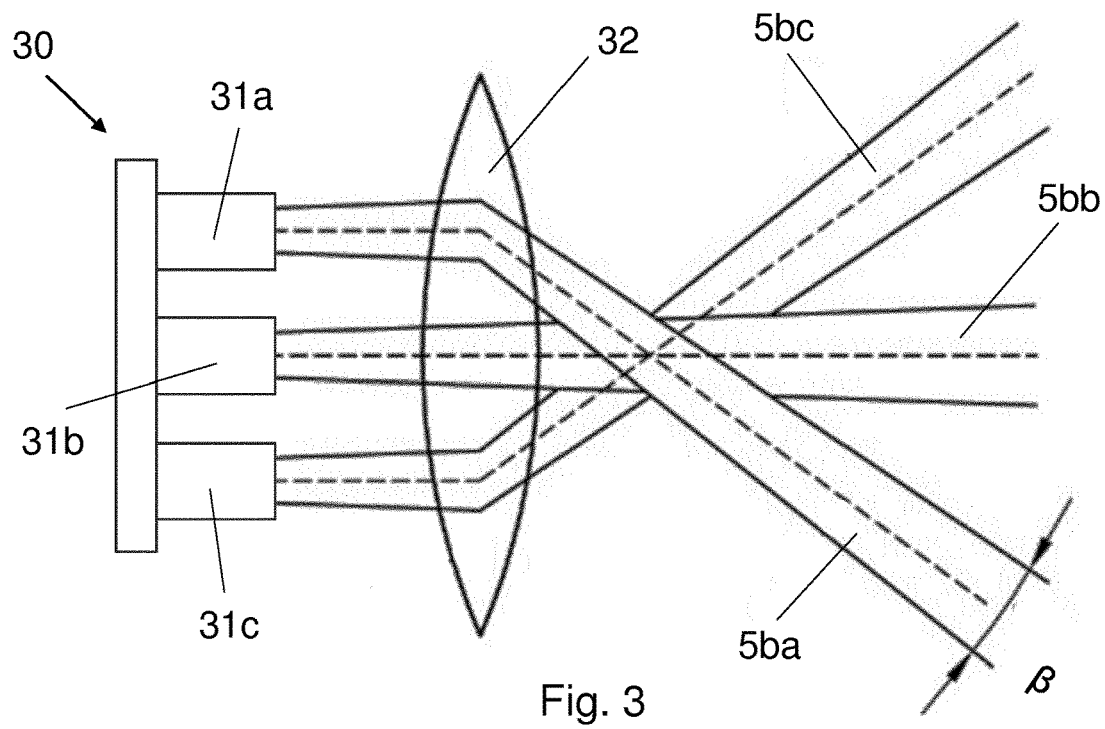
FIG. 3 shows a schematic illustration of a solid angle-selective emitter unit as part of the distance measuring unit as per FIGS. 1a, b.

FIG. 3 shows an emitter unit 30 which is designed for solid angle-selective radiation of the pulses. To this end, it comprises a plurality of individual emitters 31a-c, each of which emitting into a respective emitter solid angle segment 5ba-bc. This is achieved by means of an optical unit 32, which converts the arrangement of the individual emitters 31a-c in a row into a solid angle distribution, i.e., steers the pulses in the respective directions.

Figure 4:
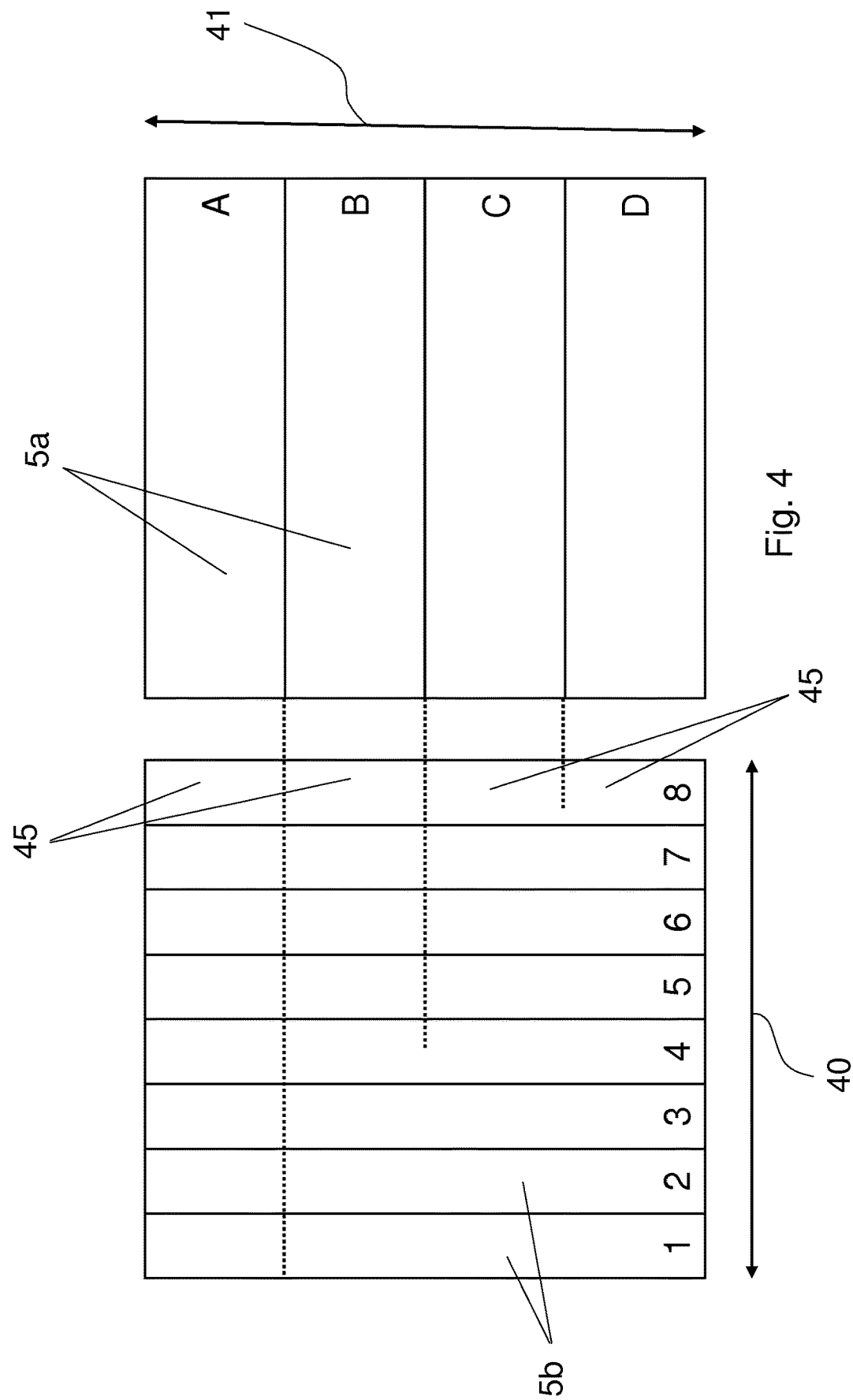
FIG. 4 shows a schematic illustration of an option for subdividing a detection field in matrix-type fashion using a receiver unit as per FIG. 2 and an emitter unit as per FIG. 3.

FIG. 4 illustrates how the combination of an emitter unit according to FIG. 3, which is solid angle-resolving along one axis 40, and a receiver unit according to FIG. 2, which is solid angle-resolving along an axis 41 perpendicular thereto, allows the detection field 4 to be subdivided in matrix-shaped fashion (into rows and columns). Using the solid angle-resolving receiver unit, each of the emitter solid angle segments 5b is subdivided into four matrix fields 45 in the present case. Overall, a respective matrix field arises as a combination of a certain row with a certain column. In the present case, there is a total of 32 matrix fields 45; naturally, this could also be varied. Moreover, the ratio of emitter-side and receiver-side resolution could also be inverted, for example; thus, the receiver unit could create a subdivision into eight receiver solid angle segments in conjunction with four emitter-side emitter solid angle segments.

Figure 5:
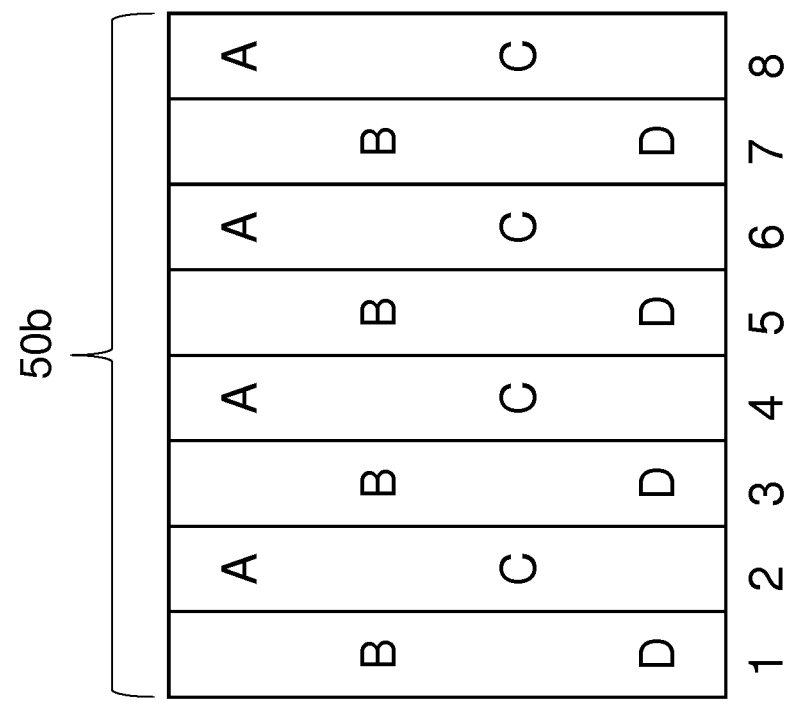
FIG. 5 shows an option for scanning the detection field subdivided as per FIG. 4 in successive scanning cycles.
Figure 5:
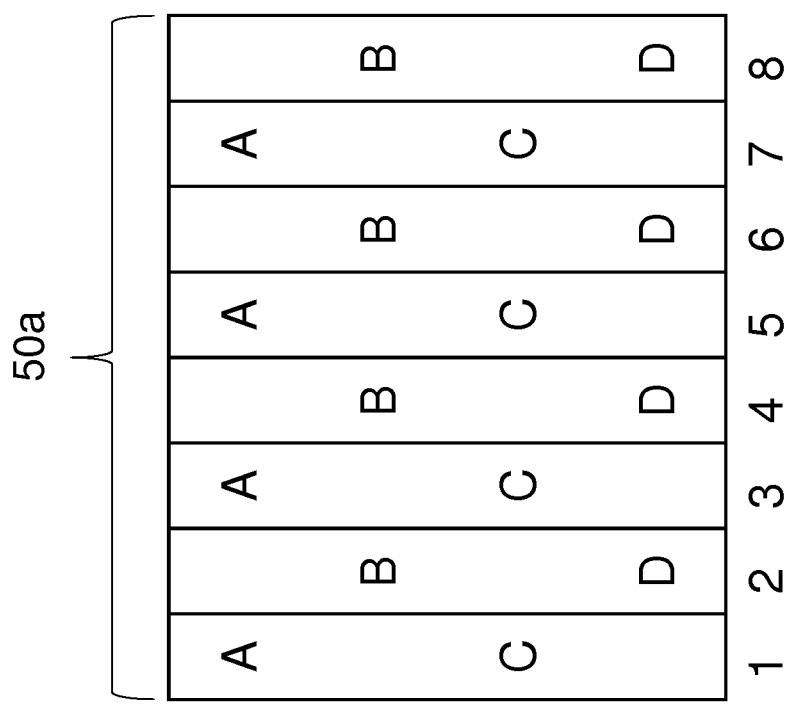

Proceeding from the illustration according to FIG. 4, FIG. 5 shows how the detection field can be scanned in successive scanning cycles 50a, b. A peculiarity lies in the fact that it is not all matrix fields 45 but only a subset thereof that are scanned in each case in the scanning cycles 50a, b. This is advantageous in view of the frame rate; the measurement time is shorter for each individual scanning cycle 50a, b. By way of example, the following scan could be carried out in the first scanning cycle 50a: <1-A>, <2-B>, . . . , <8-B>, <1-C>, <2-D>, . . . , <8-D>. An advantage herein lies in the fact that the same emitter does not emit twice in direct succession. Naturally, this could also be achieved in any other way; by way of example, the image could also be constructed from the inside to the outside (or vice versa).

Further, the subsets of the matrix fields 45 are chosen in such a way that they are disjoint from one another from cycle to cycle and, in the process, span substantially the entire detection field 4 in each cycle. If a distance image with a higher resolution is desired, for example because an object was determined, the distance images obtained from the individual scanning cycles 50a, b can also be combined, yielding a higher spatial resolution (to the detriment of the time resolution).

FIGS. 6a-d relate to a distance measuring unit 1, in which both the emitter unit 30 and the receiver unit 20 respectively are solid angle-resolving in matrix-shaped fashion. Here, FIG. 6a illustrates the resolution arising on the emitter side. The subdivision into 9 solid angle segments 5b could be realized, for example, proceeding from the arrangement according to FIG. 3. To this end, once again three individual emitters would have to be placed next to one another in front of the plane of the drawing and three further individual emitters would have to be placed next to one another behind the plane of the drawing.

Then, FIG. 6b shows one of the emitter solid angle segments 5b in relation to the resolution arising on the receiver side. In this case, a DMD array forms the mirror unit, yielding a correspondingly fine resolution. The latter emerges in a manner analogous to the illustration as per FIG. 2, wherein a correspondingly larger number of mirror areas are arranged next to one another along both axes (in the plane of the drawing, and also, in each case, in a plurality of rows in front thereof and therebehind).

FIG. 6c now shows a first option of the interplay between emitter-side and receiver-side resolution. In this case, the scanning should be carried out at a high scanning rate, which is why the emitter solid angle segment 5b is not subdivided any further. Accordingly, all mirror areas assigned to the currently measured or scanned emitter solid angle segment 5b are in such a tilt position that a possibly incident echo pulse is reflected to the photodiode 23.

By way of example, if an object was determined in the emitter solid angle segment 5b, the latter can be detected with a higher resolution by way of the receiver unit 20. To this end, the receiver solid angle segments 5a, which further subdivide the emitter solid angle segment 5b, could initially be scanned sequentially in rows or columns, for example, i.e., successively adopt the respectively suitable tilt position. In this respect, any desired variations are also conceivable; all receiver solid angle segments 5a of the corresponding emitter solid angle segment 5b can be evaluated in succession or initially also combined in groups or evaluated distributed among subsets.

LIST OF REFERENCE SIGNS

Distance measuring unit 1
Motor vehicle 2
Objects 3a, b
Detection field 4
Horizontal aperture angle $\alpha$
Vertical aperture angle $\beta$
Aperture angle (of solid angle segments) $\delta\alpha$, $\delta\beta$
Solid angle segments 5
Receiver solid angle segment 5a
Receiver solid angle segments 5aa-ab
Emitter solid angle segment 5b
Emitter solid angle segments 5ba-bc
Pulse 6
Echo pulse 7
Receiver unit 20
Mirror unit 21
Tiltable mirror areas 21a-c
Optical unit (of the mirror unit) 22
Photodiode 23
Sensor area 23a
Detector optical unit 25

Emitter unit 30
Individual emitters 31a-c
Optical unit (of the receiver unit) 32
Axis (of the emitter solid angle segments) 40
Axis (of the receiver solid angle segments) 41
Matrix fields 45
Scanning cycles 50a, b

The invention claimed is:

1. A distance measuring unit for measuring, on basis of a time-of-flight signal, a distance to an object situated in a detection field, the distance measuring unit comprising:
an emitter unit for emitting pulses in form of electromagnetic radiation;
a receiver unit comprising a sensor area for receiving the electromagnetic radiation in form of echo pulses, and a mirror unit disposed upstream of the sensor area,
wherein the detection field of the receiver unit is subdivided into a plurality of receiver solid angle segments,
wherein the plurality of receiver solid angle segments are assigned to the same sensor area in that echo pulses incident on the mirror unit from a respective receiver solid angle segment are reflected onto the sensor area when the mirror unit is in a tilt state associated with the respective receiver solid angle segment,
wherein the mirror unit comprises a plurality of mirror areas configured to tilt independently of one another, and
wherein each of the mirror areas is assigned to a respective receiver solid angle segment such that, in a respective tilt position of the respective mirror area, a respective echo pulse from the respective receiver solid angle segment is reflected onto the sensor area at the respective mirror area; and
a common optical unit positioned between the sensor area and the plurality of mirror areas.

2. The distance measuring unit as claimed in claim 1, wherein the sensor area is formed on a photodiode.

3. The distance measuring unit as claimed in claim 1, wherein each of the plurality mirror areas is formed by a respective mirror component and the mirror components are assembled to form an array.

4. The distance measuring unit as claimed in claim 1, wherein a common optical unit is disposed upstream of the plurality of mirror areas of the mirror unit such that the respective mirror area is imaged into the respectively assigned receiver solid angle segment.

5. The distance measuring unit as claimed in claim 1, wherein the emitter unit is configured to emit selective radiation of a respective pulse into one of a plurality of emitter solid angle segments into which the detection field has been subdivided.

6. The distance measuring unit as claimed in claim 5, wherein the emitter unit comprises a plurality of individual emitters, each with a dedicated emission area, the individual emitters being designed for mutually independent actuation and emission.

7. The distance measuring unit as claimed in claim 5, wherein the detection field is subdivided into the receiver solid angle segments along a first axis and subdivided into the emitter solid angle segments along a second axis, which is at an angle to the first axis such that the detection field is scanned into matrix fields.

8. The distance measuring unit as claimed in claim 6, wherein the distance measuring unit is configured for operating such that, after a first individual emitter has emitted into a first emitter solid angle segment and a matrix field of the first emitter solid angle segment was scanned, a second individual emitter initially emits into a second emitter solid angle segment and a matrix field of the second emitter solid angle segment is scanned before the first individual emitter emits into the first emitter solid angle segment again.

9. The distance measuring unit as claimed in claim 7, wherein the distance measuring unit is configured for operating such that a first subset of the matrix fields is scanned in a first scanning cycle and a second subset of the matrix fields is scanned in a second scanning cycle that follows the first scanning cycle, and wherein the matrix fields of the first and second subsets at least partly differ and the matrix fields of each subset span the detection field when considered on their own.

10. The distance measuring unit as claimed in claim 9, wherein the distance measuring unit is configured to combine a first distance image, which arises from the first scanning cycle, and a second distance image, which arises from the second scanning cycle, to form one distance image.

11. The distance measuring unit as claimed in claim 1, wherein the receiver unit is configured for matrix-type scanning of the detection field such that the receiver solid angle segments subdivide the detection field along two axes that are angled with respect to one another.

12. The distance measuring unit as claimed in claim 1, wherein the emitter unit is configured for matrix-type scanning of the detection field such that the pulses are mitted into an emission field that comprises a plurality of emitter solid angle segments that subdivide the detection field along two axes that are angled with respect to one another.

13. The distance measuring unit as claimed in claim 12, wherein a resolution arising from the receiver solid angle segments and a resolution arising from the emitter solid angle segments differ.

14. The distance measuring unit of claim 1, wherein the distance measuring unit operates within a motor vehicle.

15. A method for measuring a distance, the method comprising:
emitting, by an emitter unit, pulses in form of electromagnetic radiation; and
receiving, by a receiver unit, the electromagnetic radiation in form of echo pulses,
wherein the receiver unit comprises a sensor area and a mirror unit upstream of the sensor area,
wherein a detection field of the receiver unit is subdivided into a plurality of receiver solid angle segments,
wherein the plurality of receiver solid angle segments are assigned to the same sensor area in that echo pulses incident on the mirror unit from a respective receiver solid angle segment are reflected onto the sensor area when the mirror unit is in a tilt state associated with the respective solid angle segment,
wherein the mirror unit comprises a plurality of mirror areas configured to tilt independently of one another,
wherein each of the mirror areas is assigned to a respective receiver solid angle segment such that, in a respective tilt position of the respective mirror area, a respective echo pulse from the respective receiver solid angle segment is reflected onto the sensor area at the respective mirror area, and
wherein a common optical unit is positioned between the sensor area and the plurality of mirror areas.

* * * * *